June 10, 1952  O. E. HILL  2,599,992
GRINDING MACHINE
Filed May 2, 1951  3 Sheets-Sheet 1

Inventor
OIVA E. HILL

By Harold W. Eaton
Attorney

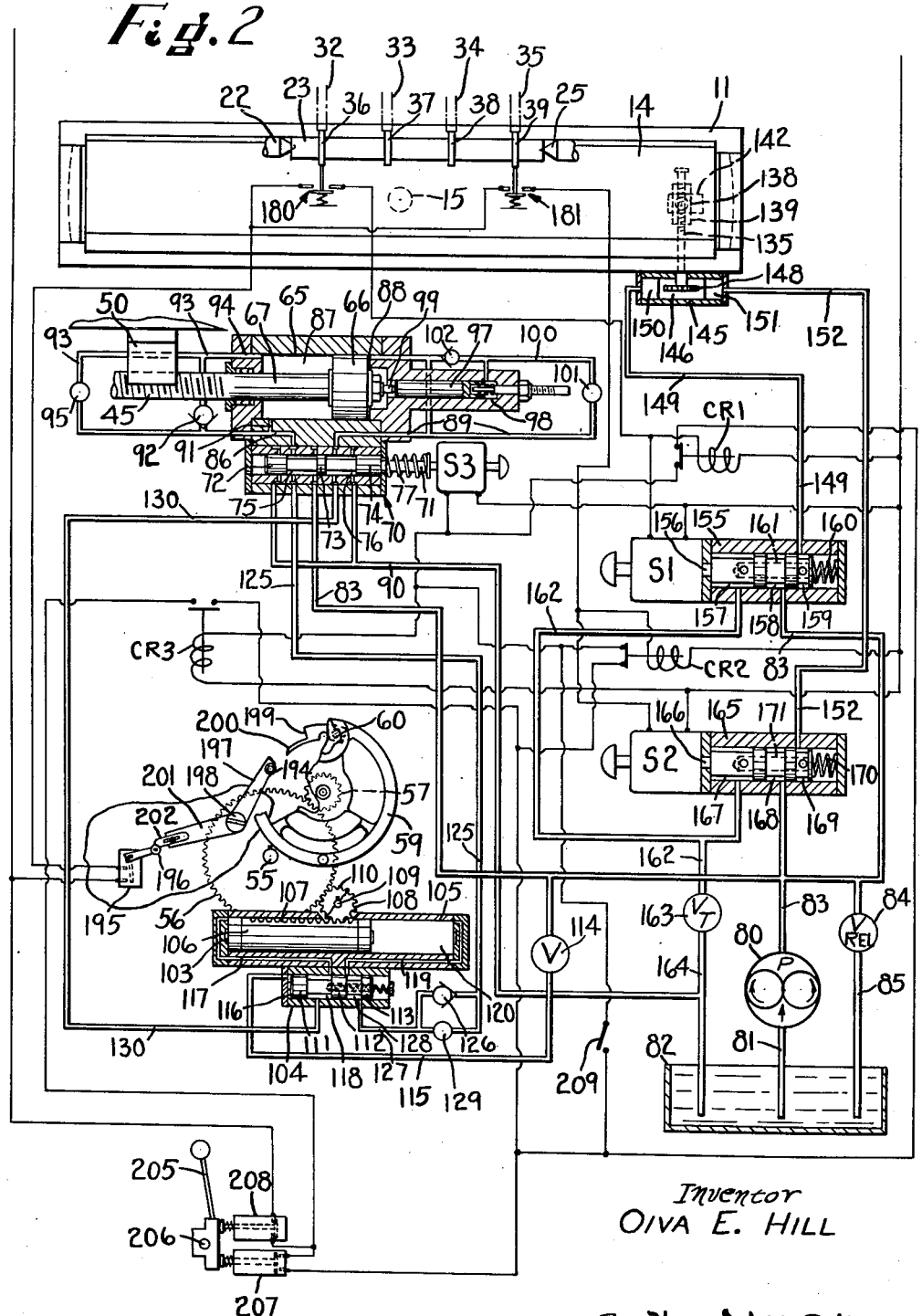

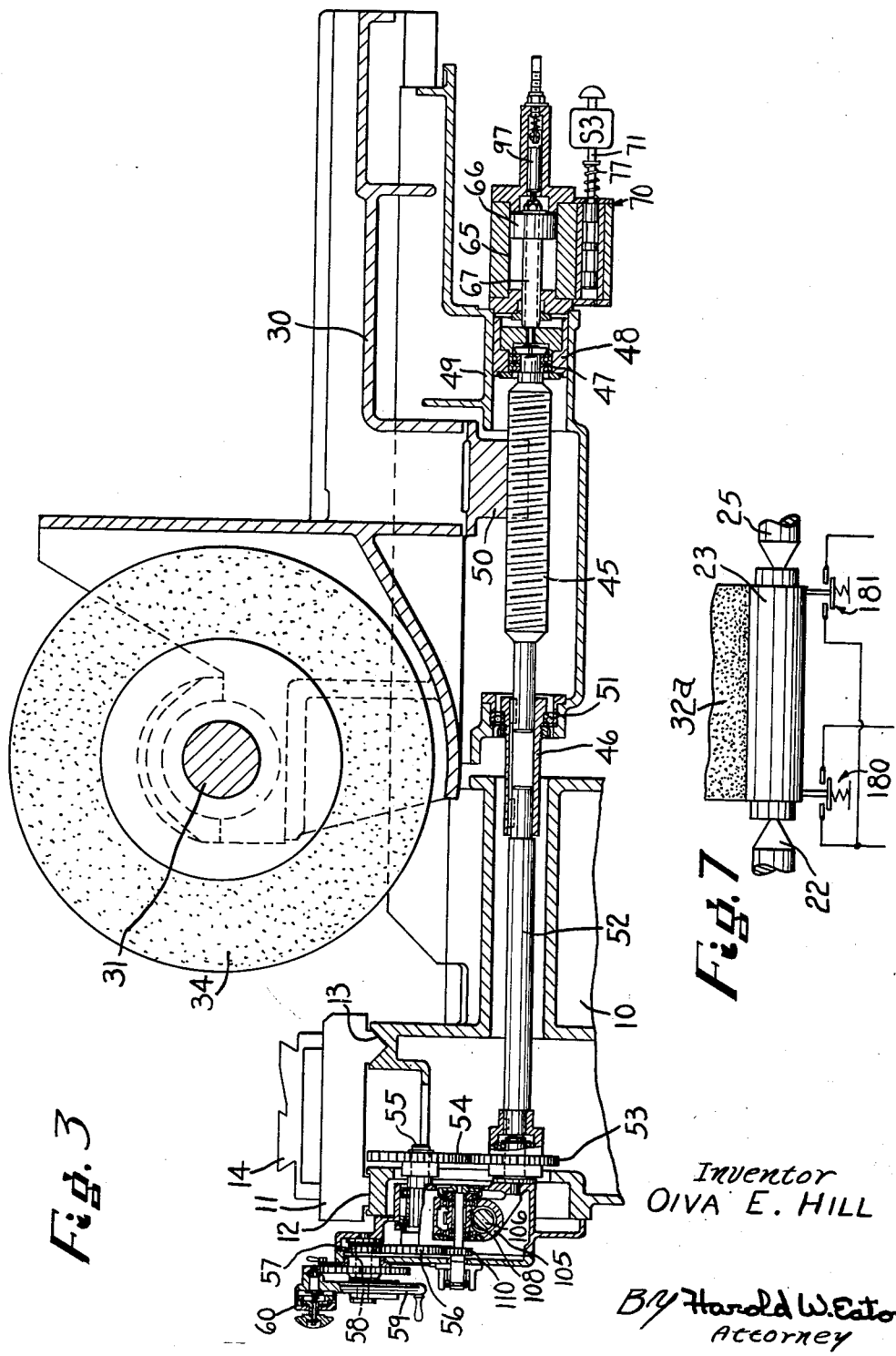

Patented June 10, 1952

2,599,992

UNITED STATES PATENT OFFICE 2,599,992

GRINDING MACHINE

Oiva E. Hill, West Boylston, Mass., assignor to Norton Company, Worcester, Mass., a corporation of Massachusetts Application May 2, 1951, Serial No. 224,189

8 Claims. (Cl. 51—95)

The invention relates to grinding machines and more particularly to an automatically controlled mechanism to compensate for taper on a workpiece.

One object of the invention is to provide a simple and thoroughly practical grinding machine with an automatically controlled mechanism for compensating for taper on a workpiece. Another object of the invention is to provide a grinding machine with an automatically controlled mechanism for moving the swivel table to compensate for differences of diameter in two spaced portions of a workpiece. Another object of the invention is to provide an automatically controlled mechanism for swivelling the work table so that two or more spaced grinding wheels may grind portions of a workpiece to the desired and predetermined size. Other objects will be in part obvious or in part pointed out hereinafter.

The invention accordingly consists in the features of construction, and arrangements of parts, as will be exemplified in the structure to be hereinafter described and the scope of the application of which will be indicated in the following claims.

In the accompanying drawings in which is shown one of various possible embodiments of the mechanical features of this invention, Fig. 1 is a plan view of a grinding machine embodying this invention;

Fig. 2 is a combined hydraulic and electrical diagram illustrating the hydraulic and electrical controls for the machine;

Fig. 3 is a fragmentary cross-sectional view, on an enlarged scale, through the grinding machine showing the grinding wheel feeding mechanism;

Fig. 7 is a fragmentary view showing a modification illustrating the application of this invention to a wide wheel grinding operation.

Figure 6:
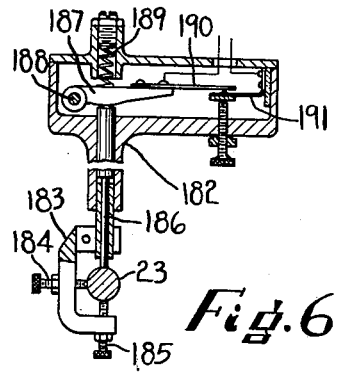
Fig. 6 is a fragmentary sectional view through a work gauging head.
Figure 5:
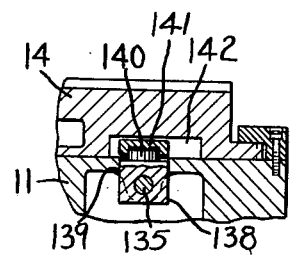
Fig. 5 is a fragmentary vertical sectional view, on an enlarged scale, taken approximately on the line 5—5 of Fig. 1 through the nut for controlling the swivelling movement of the table.
Figure 1:
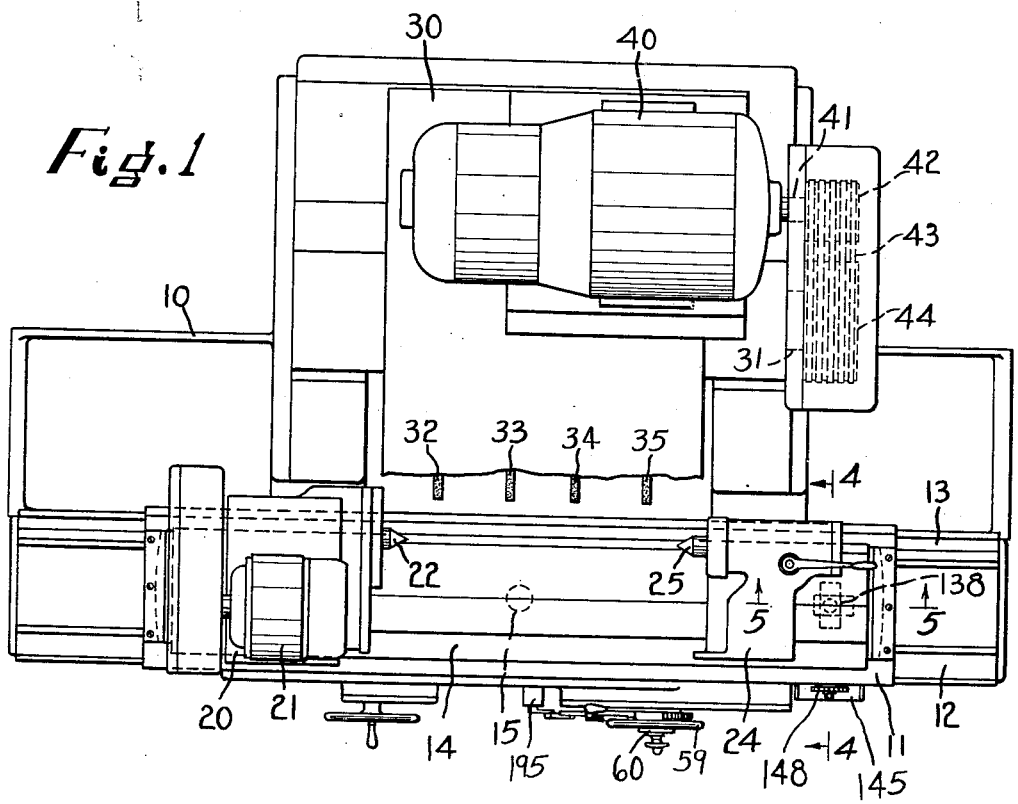
Figure 4:
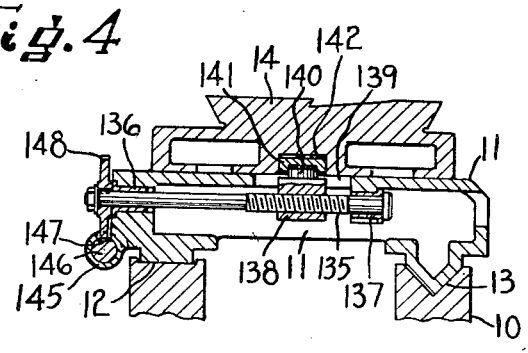
Fig. 4 is a fragmentary cross-sectional view, on an enlarged scale, taken approximately on the line 4—4 of Fig. 1 through the table swivelling mechanism.

A grinding machine has been illustrated in the drawings comprising a base 10 which supports a longitudinally reciprocable table 11 on a flatway 12 and a V-way 13 formed on the upper surface of the base 10. The table 11 serves as a support for a swivel table 14 which is mounted to pivot about a stud 15 fixedly supported on the table 11.

The swivel table 14 serves as a support for a rotatable work supporting mechanism comprising a headstock 20 which is driven by an electric motor 21. The headstock 20 is provided with a headstock center 22 for supporting the left-hand end of a workpiece 23 to be ground. The swivel table 14 also supports a footstock 24 having a footstock center 25 for rotatably supporting the right-hand end of the workpiece 23.

The base 10 also serves as a support for a transversely movable wheel slide 30 which is arranged to slide transversely on a suitable V and flatway (not shown) formed on the upper surface of the base 10. The wheel slide 30 is provided with a rotatable wheel spindle 31 which supports a plurality of spaced grinding wheels 32, 33, 34 and 35 which are arranged to grind spaced portions 36, 37, 38 and 39 of the workpiece 23. The wheel spindle 31 may be driven by means of an electric motor 40 mounted on the upper surface of the wheel slide 30. The motor is provided with an armature shaft 41 which supports a multiple V-groove pulley 42. The pulley 42 is connected by multiple V-belts 43 with a multiple V-groove pulley 44 mounted on the right-hand end of the wheel spindle 31.

A suitable wheel feeding mechanism may be provided for producing a transverse feeding movement of the wheel slide 30. This mechanism may comprise a rotatable feed screw 45, the left-hand end of which is slidably keyed within a rotatable sleeve 46. The right-hand end of the feed screw 45 is journalled in anti-friction bearings 47 carried by a sleeve 48 which is journalled in a cylindrical aperture 49 formed within the base 10. The wheel slide 30 is provided with a depending half-nut 50 which meshes with the feed screw 45.

The sleeve 46 is rotatably journalled in an anti-friction bearing 51 carried by the base 10. A shaft 52 is slidably keyed within the left-hand end of the sleeve 46. The other end of the shaft 52 is provided with a gear 53 which meshes with a gear 54. The gear 54 is mounted on a rotatable shaft 55. The left-hand end of the shaft 55 is provided with a gear 56 which meshes with a gear 57. The gear 57 is rotatably supported on a shaft 58 and is adjustably connected with a manually operable feed wheel 59 by means of a micrometer adjusting mechanism 60. It will be readily apparent from the foregoing disclosure that a rotation motion of the feed wheel 59 will be imparted through the mechanism above described to rotate the feed screw 45 and thereby produce a transverse feeding movement of the wheel slide 30 together with the grinding wheels 32, 33, 34 and 35. The direction of rotation of the feed wheel 59 determines the direction of movement of the slide 30.

A wheel positioning and feeding mechanism is provided for causing the wheel slide 30 to move forwardly to an operative position by means of an hydraulically operated mechanism comprising a cylinder 65. The cylinder 65 contains a slidably mounted piston 66 which is connected to one end of a piston rod 67. The piston rod 67 is arranged in axial alignment with the feed screw 45 and the slidably mounted sleeve 48. The left-hand end of the piston rod 67 is fastened to the sleeve 48.

A feed control valve 70 is provided for controlling the admission to and exhaust of fluid from the cylinder 65. This valve is a piston-type valve comprising a valve stem 71 having a plurality of spaced valve pistons 72, 73 and 74 formed integrally therewith. The valve pistons 72, 73 and 74 are spaced from each other to form valve chambers 75 and 76. A compression spring 77 serves normally to hold the valve stem 71 in a right-hand end position. An electric solenoid S3 when energized serves to shift the valve stem toward the left to reverse the flow of fluid to the cylinder 65.

A suitable hydraulic system is provided for supplying fluid under pressure to the cylinder 65. This system may comprise a motor driven fluid pump 80 which draws fluid through a pipe 81 from a fluid reservoir 82 and forces fluid under pressure through a pipe 83 to the control valve 70. A pressure relief valve 84 is provided in the pipe line 83 by means of which excess fluid under pressure may be returned directly through a pipe 85 into the reservoir 82. In the position of the valve 70 (Fig. 2) fluid under pressure in the pipe 83 passes through the valve chamber 75, through a passage 86 into a cylinder chamber 87 to cause the piston 66 to move toward the right into the position illustrated in Fig. 2. During this movement of the piston 66 fluid within a cylinder chamber 88 exhausts through a passage 89, through the valve chamber 76 and through an exhaust pipe 90 into the reservoir 82.

Fluid under pressure passing through the passage 86 may pass through a port 91 into the cylinder chamber 87 or during the initial movement thereof may pass through a ball check valve 92, through a passage 93, through a port 94 into the cylinder chamber 87.

It is desirable to provide a suitable cushioning means for slowing down the rapid approaching movement of the wheel slide 30 before the piston 66 engages the left-hand end of the cylinder 65. This is preferably accomplished by arranging the port 91 so that the piston 66 covers the port 91 before the piston 66 engages the left-hand end of the cylinder 65. After the port 91 is covered, fluid under pressure exhausts through the port 94 through the passage 93, through a throttle valve 95 into the passage 86. It will be readily apparent from the foregoing disclosure that the throttle valve 95 serves to slow down the exhaust of fluid from the cylinder chamber 87 thereby cushioning the movement of the piston 66 as it moves into a left-hand end position.

Similarly it may be desirable to cushion the rearward movement of the wheel slide 30. This is preferably accomplished by a dashpot mechanism comprising a dashpot piston 97 which is slidably mounted with a dashpot cylinder 98. Before the piston 66 reaches the right-hand end of the cylinder 65, a projection 99 on the piston rod 67 engages the dashpot piston 97 so that fluid exhausting from the dashpot cylinder 98 must pass through a pipe or passage 100, through a throttle valve 101 into the passage 89. The setting of the throttle valve 101 determines the cushioning movement of the dashpot piston 97. A ball check valve 102 is provided so that when fluid under pressure is passed through the passage 89 into the cylinder chamber 88, fluid under pressure may also pass through the ball check valve 102 to refill the dashpot cylinder chamber for the next cushioning movement.

A suitable feeding mechanism is provided for producing a slow precise feeding movement of the grinding wheels during the grinding operation. In the preferred form, a hydraulically operated mechanism is provided so that the feed screw 45 may be rotated to produce the desired grinding feed. As above described, a manually operable feed wheel 59 is mounted on the front of the machine base 10. The feed wheel 59 is operatively connected to rotate the gear 57 which meshes with the gear 56 keyed on the front end of the shaft 55. A hydraulically operated mechanism is provided comprising a cylinder 105 which contains a slidably mounted piston 106. The upper surface of the piston 106 is provided with a rack bar 107 which meshes with a gear 108. The gear 108 is fixedly mounted on a rotatable shaft 109. The shaft 109 also carries a gear 110 which meshes with the gear 56. It will be readily apparent from the foregoing disclosure that when fluid under pressure is admitted to either end of the cylinder 105 to cause an endwise movement of the piston 106, a rotary motion will be imparted, through the mechanism above described, to rotate the feed screw 45 and thereby impart a feeding movement to the wheel slide 30 and the grinding wheels 32, 33, 34 and 35.

A suitable bypass valve 104 is provided to facilitate manual rotation of the feed wheel 59 when desired. This valve is preferably a piston type valve having a plurality of spaced valve pistons 111, 112 and 113. When it is desired to manually adjust the feed wheel 59, a valve 114 in the pipe line 83 may be opened to pass fluid through a pipe 115 into an end chamber 116 of the bypass valve 104. Pressure in the chamber 116 causes the valve member to move toward the right (Fig. 2) so that fluid may readily bypass from a chamber 103 at the left-hand end of the cylinder 105, through a passage 117, through a valve chamber 118 formed in the bypass valve 104, through a passage 119 into a cylinder chamber 120 at the right-hand end of the cylinder 105 so that the feed wheel 59 may be readily rotated manually.

The feed control valve 70 is preferably arranged to control the admission to and exhaust of fluid under pressure to the cylinder 105. As illustrated in Fig. 2 fluid under pressure passed through the pipe 83 into the valve chamber 75 may pass through a pipe 125, through a ball check valve 126 and through a pipe or passage 127, through a valve chamber 128 formed between the valve pistons 112 and 113 and through the passage 119 into the chamber 120 to reset the piston 106 when the piston 66 and the wheel slide 30 are moved to a rearward or inoperative position after a grinding operation.

When the solenoid S3 is energized to initiate an infeeding movement of the grinding wheel, fluid under pressure from the pipe 83 enters the valve chamber 75 and passes through the passage 89 into the cylinder chamber 88 to cause the piston 66 and the grinding wheel slide 30 to move forward at a rapid rate. At the same time fluid under pressure entering the valve chamber 76 passes through a pipe 130, through the valve chamber 118 in the bypass valve 104, through the passage 117 into the cylinder chamber 116 to cause the piston 106 to move toward the right to initiate a slow rotation of the feed screw 45 at a grinding speed. During this movement of the piston 106 toward the right, fluid within the cylinder chamber 120 exhausts through the passage 119, through the valve chamber 128 in the bypass valve 104, through the pipe 127 and through a throttle valve 129 into the pipe 125 where the fluid exhausts through the control valve 70 into the reservoir 82. The setting of the throttle valve 129 determines the rate of movement of the piston 106 toward the right and thereby determines the rate of rotation of the feed screw 45 and the rate of infeeding movement of the wheel slide 30 and the grinding wheels 32, 33, 34 and 45.

In order to attain the main object of this invention, it is desirable to provide an automatically actuated swivel mechanism automatically to swivel the swivel table 14 so as to compensate for taper on a workpiece or to compensate for differences in diameter of spaced portions on a workpiece. This mechanism may comprise a rotatable screw 135 which is journalled in bearings 136 and 137 in the table 11. The screw 135 meshes with a nut 138. The nut 138 is arranged to slide transversely in an elongated slot 139 formed in the upper surface of the table 11. The nut 138 is provided with an upwardly extending boss 140 which mates with an aperture formed in a slide block 141. The slide block 141 is arranged to slide longitudinally in an elongated slot 142 formed in the underside of the swivel table 14. The elongated slot 142 and the elongated slot 139 serve to facilitate an endwise movement of the nut 138 during a swivel adjustment.

A hydraulically operated mechanism is provided for imparting a rotary motion to the screw 138. This mechanism may comprise a fluid pressure cylinder 145 which contains a slidably mounted piston 146. The piston 146 is provided on its upper surface with a rack bar 147 which meshes with a gear 148 keyed on the left-hand end of the swivel screw 135. When fluid under pressure is passed through a pipe 149 into a cylinder chamber 150, the piston 146 will be caused to move toward the right (Fig. 2) to cause a rotation of the swivel screw 135 so as to swivel the swivel table 14 in a counterclockwise direction (Fig. 2). During this movement fluid within a cylinder chamber 151 may exhaust through a pipe 152. Similarly if fluid under pressure is passed through the pipe 152 into the cylinder chamber 151, the piston 146 will be caused to move toward the left thereby imparting a rotary motion to the swivel screw 135 to cause a clockwise adjustment of the swivel table 14 (Fig. 2). A control valve 155 is provided for controlling the admission to and exhaust of fluid through the pipe 149. This valve is a piston type valve comprising a valve stem 156 having a plurality of spaced pistons formed integrally therewith forming a plurality of valve chambers 157, 158 and 159. A compression spring 160 serves normally to maintain the valve stem 156 in a left-hand end position so that no fluid may pass from the pressure pipe 83 into the pipe 149. In this position of the valve 155, fluid may exhaust from the pipe 149 into the valve chamber 159, through a central aperture 161 formed within the valve stem 156, into the valve chamber 157 and out through a pipe 162, through a throttle valve 163 and a pipe 164 into the reservoir. The throttle valve 163 serves to determine the rate of exhaust of fluid from the cylinder chamber 150. A solenoid S1 is provided which when energized serves to shift the valve stem 156 toward the right so that fluid under pressure in the pipe 83 passes into the valve chamber 158 and through the pipe 149 into the valve chamber 150 to move the piston 146 toward the right. A similar valve 165 is provided for controlling the admission to and exhaust of fluid through the pipe 152. The valve 165 is a piston type valve comprising a valve stem 166 having a plurality of spaced valve pistons formed integrally therewith to form valve chambers 167, 168 and 169. A compression spring 170 serves normally to hold the valve stem 166 in a left-hand end position so that fluid under pressure in the pipe 83 can not pass into the pipe 152. In this position of the valve 165 fluid may exhaust from the cylinder chamber 151 and the pipe 152 into the valve chamber 169, through a central aperture 171, into the valve chamber 167 and pass out through the pipe 162 and the throttle valve 163 into the reservoir 82. A solenoid S2 is provided which when energized serves to shift the valve stem 166 into a right-hand end position so that fluid under pressure in the pipe 83 may pass into the valve chamber 168 and through the pipe 152 into the cylinder chamber 151 so as to cause the piston 146 to move toward the left thereby rotating the swivel screw 135 so that a clockwise swivelling adjustment is imparted to the swivel table 14.

A pair of work gauging heads 180 and 181 are provided. These gauging heads are positioned to engage spaced workpieces 36 and 39 of the workpiece 23 or in the case of a wide wheel grinding operation, the gauge heads 180 and 181 are located to engage the workpiece adjacent the opposite ends thereof as illustrated in Fig. 7. These gauge heads may be any of the standard well-known varieties. A gauge head has been illustrated in Fig. 6 comprising a frame 182 which supports a C-shaped head 183 having a pair of adjustably mounted contact screws 184 and 185. The frame 182 supports a slidably mounted plunger 186 the upper end of which engages a rock arm 187 pivotally supported on a stud 188. A compression spring 189 serves normally to exert a downward pressure on the plunger 186 to maintain the adjustable screw 185 in engagement with the workpiece 23. The rock arm 187 is provided with a contact element 190 which is arranged to swing in a clockwise direction as the workpiece is reduced in size to engage a contact element 191 which is fixedly supported and insulated from the frame 182.

Both of the gauge heads 180 and 181 are identical consequently only one of the gauge heads has been illustrated in Fig. 2. It is desirable that these gauge heads be inoperative until the workpiece is ground to approximately the desired and predetermined size. The gauge heads are connected in series with a normally open limit switch 195 having an actuating roller 196. A pivotally mounted feed stop pawl 197 is pivotally mounted on a stud 198 and arranged in the path of an adjustable stop abutment 199 carried by the feed wheel 59. When the feed wheel 59 rotates in a counter-clockwise direction during an infeeding movement of the grinding wheel, just before the abutment 199 engages the upper end of the stop pawl 197, a cam 200 carried by the abutment 199 engages a roller 194 on the stop pawl and rocks the stop pawl 197 in a counter-clockwise direction. A lever 201 which is fixedly mounted relative to the stop pawl 197 is similarly rocked in a counter-clockwise direction so that an adjustable detent 202 on the end thereof engages the actuated roller 196 and closes the limit switch 195 to render the gauge heads 180 and 181 operative.

Closing of the contact elements 190 and 191 in the gauge head 180 serves after the limit switch 195 has been closed to energize the solenoid S1 thereby shifting the valve stem 156 toward the right so that fluid under pressure is passed through the pipe 149 to cause the piston 146 to move toward the right (Fig. 2). Similarly when the contact elements 190 and 191 of the gauge head 181 are closed, the solenoid S2 is energized to shift the valve stem 166 toward the right so that fluid under pressure may pass through the pipe 152 into the valve chamber 151 to cause the piston 146 to move toward the left. If the portions 36 and 39 of the workpiece 23 are ground to the desired and predetermined size at the same instant, both of the gauge heads 180 and 181 will be closed to energize both the solenoids S1 and S2 so that fluid under pressure is simultaneously passed through the pipe 149 and 151 into cylinder chambers 150 and 151 respectively so that no motion will be imparted to the piston 146. If, however, the portion 36 is ground to size prior to the portion 39, the contacts 190 and 191 of the gauge head 180 will be closed to energize the solenoid S1 so that fluid under pressure passes through the pipe 149 into the cylinder chamber 150 to move the piston 146 toward the right thereby rotating the swivel screw 135 to impart a counter-clockwise swivelling movement to the swivel table 14. This swivelling adjustment of the table 14 continues until the portion 39 reaches size. Closing of the contacts 190 and 191 in the gauge head 181 serves to energize the solenoid S2 thereby shifting the valve stem 166 toward the right so that fluid under pressure passes through the pipe 152 into the cylinder chamber 151 thereby balancing the pressure of opposite ends of the piston 46 to stop further swivelling movement of the swivel table 14.

At the same time the contacts 190 and 191 of the gauge head 180 are closed, a relay switch CR1 is energized to open a circuit. Similarly when the contact elements 190 and 191 of the gauge head 181 are closed, a relay CR2 is energized at the same time the solenoid S2 is energized. When both of the relays CR1 and CR2 are energized thereby opening normally closed contactors, the solenoid S3 will be deenergized and the released compression of the spring 77 will return the valve stem 71 toward the right into the position illustrated in Fig. 2 thereby reversing the flow of fluid to the feed cylinders 65 and 105 so that the piston 66 causes a rearward movement of the wheel slide 30 together with the grinding wheels 32, 33, 34 and 35. At the same time the piston 106 is moved toward the left to rotate the feed screw 45 thereby resetting the feed screw into its initial position ready for the next grinding operation.

A manually operable control lever 205 is provided for controlling the stopping and starting of the wheel feeding cycle. The control lever 205 is pivotally mounted on a stud 206 mounted on the front of the machine base 10. When it is desired to start a feeding cycle, the lever 205 (Fig. 2) is rocked in a counter-clockwise direction to close a normally open start switch 207. Similarly if the control lever 205 is rocked in a clockwise direction, it actuates a stop switch 208 to open the circuit at any time during a feeding cycle if it is desired to interrupt the cycle of operation.

The operation of the improved grinding machine will be readily apparent from the foregoing disclosure. Assuming all of the adjustments to have been previously made and a workpiece 23 is mounted in position between the work supporting centers 22 and 25, a grinding cycle may be initiated by rocking the control lever 205 in a counter-clockwise direction to close the starter switch 207. Closing of the starter switch 207 serves to energize the solenoid S3 to shift the feed control valve 70 toward the left (Fig. 2) to cause a forward rapid approaching movement of the grinding wheel slide 30. At the same time, the feed control valve 70 admits fluid under pressure to the cylinder 102 to start the piston 106 moving toward the right to cause a slow rotation of the feed screw 45. The movement of the piston 66 toward the left continues until the piston engages the left-hand end of the cylinder 65 after which continued movement of the piston 106 toward the right serves to produce a grinding feed. Closing of the start switch 207 serves also to energize the normally open relay switch CR3 which sets up a holding circuit so that an instantaneous actuation of the starter switch 207 is sufficient to initiate a feeding cycle. The forward feeding movement of the grinding wheel slide continues until the cam 200 carried by the abutment 199 on the feed wheel 59 engages the roller 194 to close the normally open limit switch 195 thereby rendering the gauging heads 180 and 181 operative. The infeeding movement of the grinding wheel slide 30 continues until both of the portions 36 or 39 of the workpiece 23 have been reduced to a predetermined size. If a taper adjustment is required, the contact elements 190 and 191 of the gauge head 180 close indicating that the portion 36 is reduced to a predetermined size. The closing of the contacts 190 and 191 of the gauge head 180 serves to close a circuit to energize a relay switch CR1 which opens the normally closed contactors thereon and at the same time energizes the solenoid S1 to shift the valve stem 156 toward the right so that fluid under pressure may pass from the pipe 83 through the pipe 149 into the cylinder chamber 150 to cause the piston 146 to move toward the right. Movement of the piston 146 toward the right causes a rotation of the swivel adjusting screw 135 to swivel the swivel table 14 in a counter-clockwise direction. Due to the swivelling of the swivel table 14, grinding will continue until the contacts 190 and 191 of the gauge head 181 close indicating that the swivel table has been adjusted to compensate for taper. Closing of the contacts 190 and 191 of the gauge head 181 serves to energize the relay switch CR2 to open the normally closed contactor thereon. At the same time closing of the contactors 190 and 191 of the gauge head 180 serves to energize the solenoid S3 to shift the valve 166 toward the right so that fluid may pass from the pipe 83 through the pipe 152 into the cylinder chamber 151 thereby equalizing the pressure in the cylinder chambers 150 and 151 to stop the movement of the piston 146 toward the right.

When both of the relay switches CR1 and CR2 have been energized, a circuit is opened to deenergize the solenoid S3 thereby releasing the compression of the spring 77 so that the valve stem 71 moves toward the right (Fig. 2) so that fluid under pressure is passed into the cylinder chamber 87 rapidly to return the piston 66 and the wheel slide 30 to a rearward or inoperative position. At the same time fluid under pressure is admitted to the cylinder chamber 120 to move the piston 106 toward the left (Fig. 2) to reset the slow feeding mechanism for the next grinding cycle.

If it is desired to compensate for taper on spaced portions on a workpiece or on a relatively long workpiece and to allow a further finish grinding operation after the swivel adjustment has been made, a normally open selector switch 209 is closed. The mechanisms operate in the same manner as above described except that opening of the limit switches CR1 and CR2 will not deenergize the solenoid S3 due to the closing of the selector switch 209 which maintains the solenoid S3 energized. Grinding may then continue until the stop abutment 199 engages the upper surface of the feed pawl 197 thereby positively stopping the infeeding movement of the wheel slide 30. When the stop abutment 199 moves into engagement with the upper end of the feed pawl 197, the manually operable control lever 205 is shifted in a clockwise direction to open the stop switch 208 which breaks the circuit thereby returning the wheel slide and the grinding feed mechanism to the initial positions ready for the next cycle of operation.

The mechanism above described operates in an identical manner in grinding a relatively long workpiece such as shown in the modification illustrated in Fig. 7.

The grinding machine as above described shows the application of this invention for compensating for taper in grinding spaced portions on a single workpiece or in grinding a wide faced workpiece to a true cylindrical surface. This apparatus is equally applicable for taper grinding. The gauge heads 180 and 181 may be adjusted for a predetermined taper being ground after which the mechanism above described will function to produce the correct taper on the workpiece being ground.

It will thus be seen that there has been provided by this invention a grinding machine in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a cylindrical grinding machine having a base, a longitudinally reciprocable table thereon, a swivel table on said longitudinally reciprocable table, a rotatable work support on said swivel table for supporting a cylindrical-type workpiece, a transversely movable grinding wheel slide, a feeding mechanism therefor, an automatically actuated taper compensating mechanism to swivel said swivel table, and a pair of gauges arranged to engage spaced portions on a workpiece being ground to actuate said compensating mechanism to swivel the table so as to compensate for taper.

2. In a cylindrical grinding machine having a base, a longitudinally reciprocable table thereon, a swivel table on said longitudinally reciprocable table, a rotatable work support thereon for supporting a cylindrical-type workpiece, a transversely movable grinding wheel slide, a feeding mechanism therefor, an automatically actuated taper compensating mechanism to swivel said table, a pair of spaced independent gauges arranged to engage spaced portions on a workpiece being ground, and a control mechanism actuated by said gauges automatically to actuate said compensating mechanism to swivel the table so as to compensate for taper.

3. In a cylindrical grinding machine having a base, a longitudinally reciprocable table thereon, a swivel table on said longitudinally reciprocable table, a rotatable work support thereon including a headstock and a footstock for supporting and rotating a cylindrical-type workpiece, a transversely movable grinding wheel slide, a feeding mechanism therefor, and an automatically actuated taper compensating mechanism including a nut and screw to swivel said swivel table, power operated means to rotate said screw, a pair of spaced independent electric gauges to engage spaced portions on a workpiece being ground, and a control mechanism for said power means which is actuated by said gauges automatically to swivel said table so as to compensate for taper.

4. In a cylindrical grinding machine having a base, a longitudinally reciprocable table thereon, a swivel table on said longitudinally reciprocable table, a rotatable work support thereon including a headstock and a footstock for supporting and rotating a cylindrical-type workpiece, a transversely movable grinding wheel slide, a feeding mechanism therefor, and an automatically actuated taper compensating mechanism including a nut and screw to swivel said swivel table, a fluid motor to actuate said screw, a pair of spaced independent electric gauges arranged to engage spaced portions on a workpiece being ground, and a control mechanism for the fluid motor which is actuated by said gauges automatically to swivel said table so as to compensate for taper.

5. In a cylindrical grinding machine having a base, a longitudinally reciprocable table thereon, a swivel table on said longitudinally reciprocable table, a rotatable work support thereon including a headstock and a footstock for supporting and rotating a cylindrical workpiece, a transversely movable grinding wheel slide, a feeding mechanism therefor including a rotatable feed wheel, a positive stop for limiting the infeeding movement of said slide, and an automatic taper compensating mechanism including a nut and screw to swivel said swivel table, a fluid motor to actuate said screw, a pair of spaced independent electric gauges to engage spaced portions on a workpiece being ground, means including a limit switch actuated by rotation of the feed wheel before the positive stop is reached to render said gauges operative, said gauges serving automatically to swivel the swivel table to compensate for taper, and a selector switch to facilitate continuing the grinding operation thereafter until the positive stop limits the forward feeding movement of the wheel slide.

6. In a cylindrical grinding machine having a base, a longitudinally reciprocable table thereon, a swivel table on said longitudinal table, a rotatable work support on said swivel table including a headstock and a footstock for supporting and rotating a cylindrical workpiece, a transversely movable grinding wheel slide, a feeding mechanism therefor, and an automatically actuated taper compensating mechanism including a nut and screw to swivel said swivel table, a fluid motor to actuate said screw, a pair of independent control valves independently to control the admission to and exhaust of fluid from each side of said fluid motor, and a pair of spaced electric gauges each having normally open contacts arranged to engage spaced portions on a workpiece being ground, said gauges being arranged independently to control said control valves automatically to swivel the swivel table so as to compensate for taper.

7. In a cylindrical grinding machine having a base, a longitudinally reciprocable table, a swivel table on said longitudinal table, a rotatable work support thereon including a headstock and a footstock for supporting and rotating a cylindrical workpiece, a transversely movable grinding wheel slide, a feeding mechanism for controlling the transverse movement of the wheel slide to control the grinding operation, and an automatically actuated taper compensating mechanism including a nut and screw to swivel said swivel table, a fluid motor to rotate said screw, a pair of independent control valves independently to control the admission to and exhaust of fluid from each side of said motor, a pair of spaced normally inoperative electric gauges each having normally open contacts, said gauges being arranged to engage spaced portions on a workpiece being ground, each of said gauges being arranged to control one of said valves so as to swivel the swivel table and to compensate for taper on the workpiece being ground, and means including a limit switch actuated by and in timed relation with the feeding mechanism to render said gauges operative before the workpiece has been ground to a predetermined size to effect a taper compensation.

8. In a cylindrical grinding machine as claimed in claim 7, in combination with the parts and features therein specified in which the feeding mechanism includes a piston and cylinder for causing a transverse feeding movement of the wheel slide, a solenoid-actuated control valve therefor, and means including a start switch to energize said solenoid to initiate a grinding cycle, said gauges being arranged automatically to swivel the swivel table to compensate for taper and being arranged so that after both of the gauges have operated to deenergize said solenoid to move the wheel slide to an inoperative position.

OIVA E. HILL.

REFERENCES CITED

The following references are of record in the file of this patent:

UNITED STATES PATENTS

| Number | Name | Date |
|---|---|---|
| 1,970,000 | Dunbar et al. | Aug. 14, 1934 |
| 2,151,669 | Wood et al. | Mar. 21, 1939 |
| 2,247,228 | Flygare | June 24, 1941 |